United States Patent
Witkos (10) Patent No.: US 11,118,890 B2
(45) Date of Patent: Sep. 14, 2021

(54) SCANNING JOGBOX (71) Applicant: Hexagon Metrology, Inc., North Kingstown, RI (US)

(72) Inventor: Paul Witkos, Middletown, RI (US)

(73) Assignee: Hexagon Metrology, Inc., North Kingstown, RI (US)

(*) Notice: Subject to any disclaimer, the term of this patent is extended or adjusted under 35 U.S.C. 154(b) by 69 days.

(21) Appl. No.: 16/519,962

(22) Filed: Jul. 23, 2019

(65) Prior Publication Data
US 2020/0025547 A1 Jan. 23, 2020

Related U.S. Application Data

(60) Provisional application No. 62/702,051, filed on Jul. 23, 2018.

(51) Int. Cl.
*G01B 5/008* (2006.01)

(52) U.S. Cl.
CPC ..................... *G01B 5/008* (2013.01)

(58) Field of Classification Search
CPC ................................ G01B 5/008; G01B 7/008
USPC ............................................................ 33/503
See application file for complete search history.

(56) References Cited

U.S. PATENT DOCUMENTS

| | | | |
|---|---|---|---|
| 6,158,136 A * | 12/2000 | Gotz | G01B 3/008 33/503 |
| 6,366,831 B1 * | 4/2002 | Raab | B25J 9/1692 33/503 |
| 6,741,906 B2 | 5/2004 | Walther et al. | |
| 8,352,212 B2 | 1/2013 | Fetter et al. | |
| 8,581,855 B2 | 11/2013 | Spink et al. | |
| 9,329,595 B2 | 5/2016 | Lankalapalli et al. | |
| 10,086,273 B2 | 10/2018 | Jones et al. | |
| 2010/0039391 A1 | 2/2010 | Spink et al. | |

(Continued)

FOREIGN PATENT DOCUMENTS

| EP | 2154472 A2 | 2/2010 |
|---|---|---|
| EP | 2505959 A1 | 10/2012 |

(Continued)

OTHER PUBLICATIONS

International Search Report and Written Opinion for Application No. PCT/US2019/043048, 24 pages, (dated Oct. 1, 2019).

*Primary Examiner* — Christopher W Fulton
(74) *Attorney, Agent, or Firm* — Nutter McClennen & Fish LLP (57) ABSTRACT

A jogbox for a coordinate measuring machine with a movable arm has a body forming an interior, and control hardware at least partially within the interior. The control hardware is configured to control the movable arm of the coordinate measuring machine. The jogbox also has an energizing port for energizing or charging the jogbox, and an auxiliary port formed by the body and operatively coupled with the controlling hardware within the interior. The auxiliary port is configured to directly physically connect with at least one hardware accessory that has a hardware interface port. In addition, the auxiliary port is configured to rigidly, removably, and directly couple with the hardware interface port of the at least one hardware accessory. Some embodiments include a counterweight interface configured to receive and retain a counterweight to counterbalance the weight of an accessory.

20 Claims, 10 Drawing Sheets

(56) References Cited

U.S. PATENT DOCUMENTS

| | | | |
|---|---|---|---|
| 2011/0192042 A1* | 8/2011 | McMurtry | G05B 19/401 |
| | | | 33/503 |
| 2012/0229662 A1 | 9/2012 | Lankalapalli et al. | |
| 2015/0052769 A1* | 2/2015 | Noda | G01B 21/047 |
| | | | 33/503 |
| 2015/0345932 A1* | 12/2015 | Wakai | G01B 21/047 |
| | | | 33/503 |
| 2016/0341533 A1* | 11/2016 | Noda | G01B 5/008 |
| 2017/0188831 A1 | 7/2017 | Adler et al. | |
| 2018/0372480 A1* | 12/2018 | Hidaka | G01B 7/008 |
| 2019/0030425 A1 | 1/2019 | Jones et al. | |
| 2019/0078867 A1* | 3/2019 | Noda | G01B 5/20 |

FOREIGN PATENT DOCUMENTS

| | | |
|---|---|---|
| EP | 2614415 A1 | 7/2013 |
| EP | 2722728 A1 | 4/2014 |

\* cited by examiner

SCANNING JOGBOX

CROSS-REFERENCE TO RELATED APPLICATION(S)

This patent application claims the benefit of U.S. Provisional Patent Application No. 62/702,051 entitled SCANNING JOGBOX filed Jul. 23, 2018, which is hereby incorporated herein by reference in its entirety.

FIELD OF THE INVENTION

The invention generally relates to coordinate measuring machines and, more particularly, the invention relates to jogboxes used with coordinate measurement machines.

BACKGROUND OF THE INVENTION

Coordinate measuring machines (CMMs) are the gold standard for accurately measuring a wide variety of different types of work pieces. For example, CMMs can measure critical dimensions of aircraft engine components, car engine cylinders, surgical tools, and gun barrels. Precise and accurate measurements help ensure that their underlying systems, such as an aircraft in the case of aircraft components, operate as specified.

CMMs typically have a probe extending from an arm that is movable in up to six dimensions. Many CMMs also have an adjunct device, known as a "jogbox," that enables an operator to control the CMM. For example, an operator may use a jogbox to precisely position the arm relative to an object being measured at the beginning of the measurement process.

SUMMARY OF VARIOUS EMBODIMENTS

In accordance with one embodiment of the invention, a jogbox for a coordinate measuring machine with a movable arm has a body forming an interior, a CMM interface configured with a CMM communication protocol to communicate with the coordinate measuring machine, and control hardware at least partially within the interior. The control hardware is configured to control the movable arm of the coordinate measuring machine using the CMM interface. The jogbox also has an energizing port for energizing or charging the jogbox, and an auxiliary port formed by the body and operatively coupled with the controlling hardware within the interior. The auxiliary port is configured to directly physically connect with at least one hardware accessory that has a hardware interface port. In addition, the auxiliary port is configured to rigidly, removably, and directly couple with the hardware interface port of the at least one hardware accessory.

The auxiliary port is configured to couple with the hardware interface port without a connecting cable. Moreover, the energizing port may be any of a variety of different types of ports, such as a wireless energizing port (using a direct connection) or a wired energizing port (i.e., requiring a physical connection, such as a cable). To facilitate use, the body is configured to be hand-held.

When coupled, the housing and the hardware accessory may form a removably coupled unitary object. The jogbox also may have a display operatively coupled with the auxiliary port. Among other things, the hardware accessory may include one or more of a thermal camera, a bar code scanner, a label printer, a display device, a joystick, and an additional control interface to the control hardware. The hardware accessory may have any of a variety of form factors, such as a dongle.

The auxiliary port may be configured in accordance with any of a variety of different interface standards, such as a USB standard (i.e., a USB port). For security purposes, the jogbox also may include an authentication sensor for authenticating a user. For example, the authenticator sensor may include a fingerprint scanner. To those ends, the authentication sensor may be operatively coupled with the control hardware, or some external security apparatus.

Some embodiments of a handheld jogbox include a counterweight interface configured to receive and retain a set of counterweights. For example, the counterweight interface in some embodiments includes a receptacle having a volume within the interior of the jogbox, which receptacle is configured to retain a set of counterweights within the interior. To that end, some embodiments include a cover configured to close the receptacle and retain a set of counterweights within the receptacle.

In other embodiments, the counterweight interface is configured to hold a set of counterweights external to the interior of the jogbox. Examples of such a counterweight interface include a connector (e.g., a threaded or press-fit connector) to which one or more counterweights 745 may be removably coupled.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, a jogbox for a coordinate measuring machine ("CMM") has an interface to rigidly, removably, and directly connect with an accessory hardware device. Among other things, the hardware accessory device may be one or more of a thermal camera, a bar code scanner, a label printer, a display device, a joystick, a wireless interface to wirelessly connect with other devices (e.g., using Near Field Communication standards) and an additional control interface to internal control hardware. The hardware accessory may have any of a variety of form factors, such as a dongle. Details of illustrative embodiments are discussed below.

Figure 1:
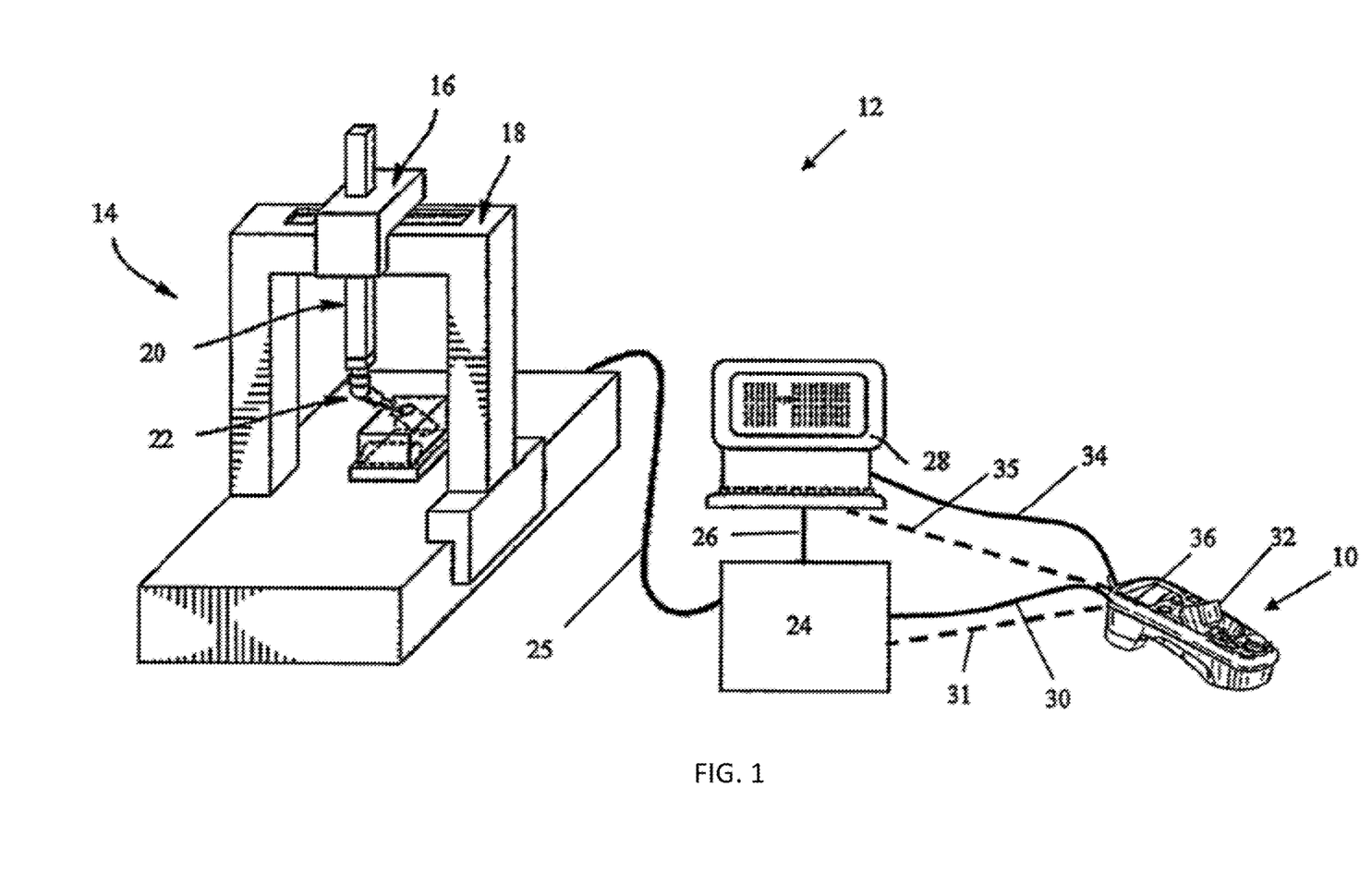
FIG. 1 schematically shows a CMM system that may be configured in accordance with illustrative embodiments of the invention.

FIG. 1 schematically shows one embodiment of a CMM system 12 having a coordinate measuring machine 14 ("CMM 14") and a jogbox 10 with one or more interfaces to accommodate the above noted accessory hardware devices. To that end, the coordinate measuring machine 14 includes a movable portion, including a carriage 16, a bridge 18 and a Z-ram 20, for moving an articulating probe 22 in the X, Y and Z directions respectively. To control the CMM 14, a coordinate measuring machine controller 24 operatively couples to actuators of the carriage 16, the bridge 18, and the Z-ram 20 via a cable 25 or other means (e.g., wirelessly). As the controller 24 receives coordinate measurement data from the CMM 14, it sends the data via a connection 26 to a computer 28 configured to execute a dimensional metrology application (e.g., a measuring platform, such as PC-DMIS, distributed by Hexagon Metrology, Inc.). The dimensional metrology application may analyze the data and, in some embodiments, determine additional desired measurements. In addition, the dimensional metrology application may provide corresponding control commands to controller 24.

The jogbox 10 may be used to manually control the CMM 14. Manual control may be used, for example, to establish an initial positioning of a work piece/object to be measured, to develop part programs, or to place the probe 22 in a safe position when securing or removing the work piece/object. The jogbox has interface controls, such as buttons and/or a joystick 32 that generates and sends signals to the controller 24, causing controlled probe movement. The jogbox 10 may be operatively connected to the coordinate measuring machine controller 24 (i.e. and thus to the CMM 14) with a communications cable 30 and/or with a wireless connection 31 (e.g., a Wi-Fi or RF connection). It should be noted that while FIG. 1 shows the CMM 14 as a bridge-type CMM 14, those skilled in the art recognize that illustrative embodiments may be used with other types of coordinate measuring machines. For example, some embodiments contemplate use with a cantilever coordinate measuring machine. Also, an articulating probe 22 is not required as the CMM 14 may use any of a variety of other suitable probes 22 (e.g., contact or non-contact probes).

In illustrative embodiments, the jogbox 10 sends signals to the computer 28 to control the dimensional metrology application executed on the computer 28. The dimensional metrology application preferably sends signals or control programs to the controller 24. In preferred embodiments, those signals are sent via a CMM interface 52 on the jogbox using a proprietary or standard CMM protocol. Those signals and/or control programs instruct the controller 24 to move the probe 22 (in response to signals received by the dimensional metrology application from the jogbox 10) through communications cable 34 and/or wireless connection 35. In a manner similar to the connection between the jogbox 10 and the controller 24, the communications cable 34 may be a dedicated cable used solely for communication between jogbox 10 and the dimensional metrology application executing on computer 28. In other embodiments, communications cable 34 may be configured to communicate with other software, firmware and/or hardware of computer 28 and/or to communicate with controller 24 through computer 28.

The computer 28 may send measurement data or other information to jogbox 10 (e.g., directly or via controller 24). To enhance the user experience, the jogbox 10 may include a display screen 36. In illustrative embodiments, the display screen 36 acts as a user interface and a mechanism for graphically displaying helpful information to the user. To those end, the display screen 36 may include a simple non-interactive display (e.g., an LED display), or a touch screen that enables the user to control the jogbox 10 and/or the CMM 14. The latter embodiment thus may present as a customized graphical user interface element for the metrology application. As such, the user may input data by touching the area of the touch screen associated with one or more interface elements. Among other things, the touch screen implementation may include one or more separate elements overlaying the display screen 36, may be attached to the display screen 36, may be integral with the display screen 36, or may be otherwise associated with the screen 36.

The dimensional metrology application is permitted to control the graphics display on a portion or all of a display screen 36 of jogbox 10. For purposes herein, the term "graphic" encompasses not only drawings, figures, icons, etc., but also alpha-numeric text. The graphics may include information from the dimensional metrology application and/or represent a virtual interface element to accept inputs to the dimensional metrology application from the jogbox 10.

Figure 2A:
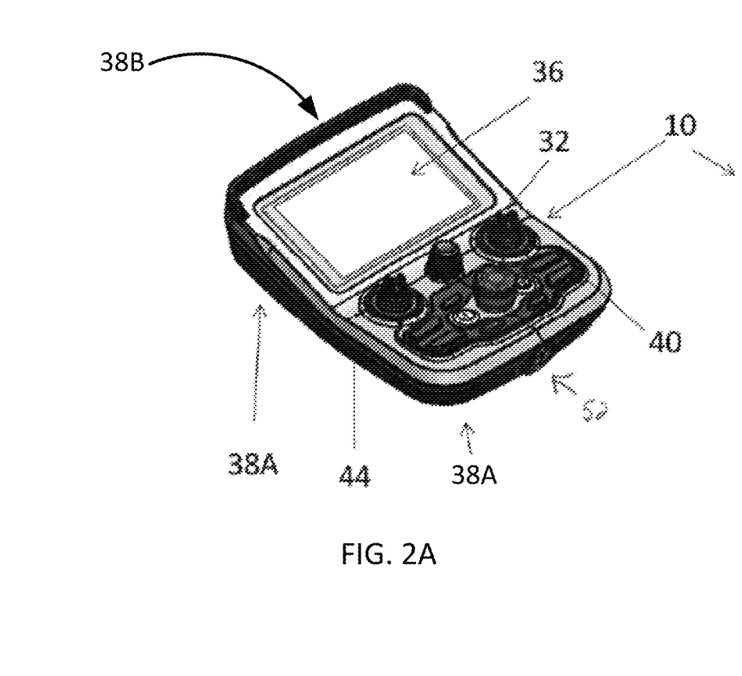
FIGS. 2A and 2B schematically show different perspective views of a jogbox configured in accordance with illustrative embodiments of the invention.
Figure 2B:
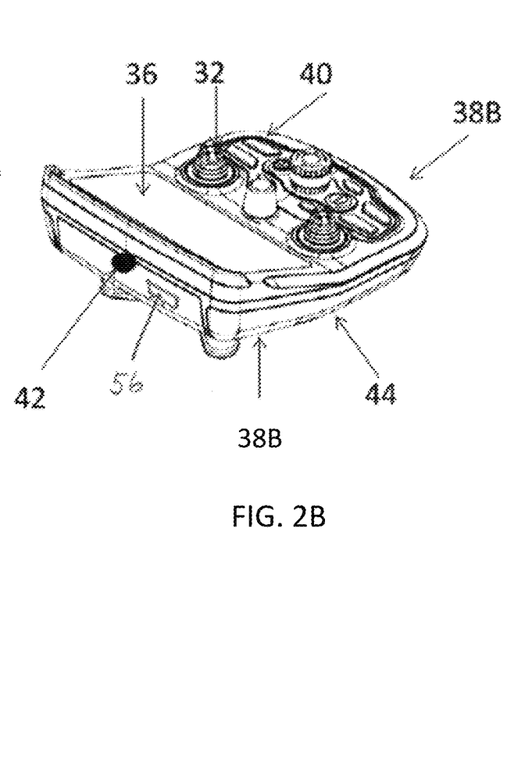

FIGS. 2A and 2B schematically show two perspective views of the noted jogbox 10 configured in accordance with illustrative embodiments of the invention. These views show the jogbox 10 as having a body/housing with a lower portion 38A having a plurality of hand controls, and a raised portion 38B having the display screen 36. The hand controls preferably are positioned so that they are accessible by the thumbs of a typical user holding the device with both hands. Among other things, exemplary arrangement of FIGS. 2A and 2B shows a plurality of hand controls, such as the prior noted joysticks 32, as well as buttons 40, knobs, etc. Those skilled in the art may arrange the various hand controls, as well as the one or more display screens 36, in any of a variety of manners and thus, the arrangement of those elements in the figures is exemplary.

The body forms an interior 15 that contains control hardware to perform the functionality of the jogbox (e.g., integrated circuits, printed circuits, memory, etc. on one or more printed circuit boards). In addition, this view shows the prior mentioned CMM interface 52, which communicates with the CMM 14 using a CMM protocol. The jogbox 10 also may have an energizing port 42 for energizing or charging the jogbox 10. As such, the jogbox 10 may have an internal battery and/or a power supply/module that enables it to be energize via a wired or wireless power connection.

In accordance with illustrative embodiments and as noted above, the jogbox 10 has an auxiliary port 56 formed by the body. This auxiliary port 56 is operatively coupled with the controlling hardware within the interior, and is specially configured to directly, physically, and removably connect with a corresponding hardware interface port (not shown) of at least one hardware accessory 58. In illustrative embodiments, the auxiliary port 56 is configured to communicate with an accessory 58 to receive from the accessory 58 information produced by the accessory. For example, when the accessory 58 is a thermal camera, the auxiliary port 56 is configured to receive from the thermal camera an image captured by the thermal camera, and when the accessory 58 is a bar code scanner the auxiliary port 56 is configured to receive from the bar code scanner data representing a bar code read by the bar code scanner. In illustrative embodiments, the auxiliary port 56 is configured to communicate with an accessory 58 to provide control signals, such as a command for the accessory to execute a function (e.g., capture a thermal image; read a bar code, etc.). In illustrative embodiments, the auxiliary port 56 is configured to communicate with the coordinate measuring machine 14, in contrast to a CMM interface 52.

Figure 3:
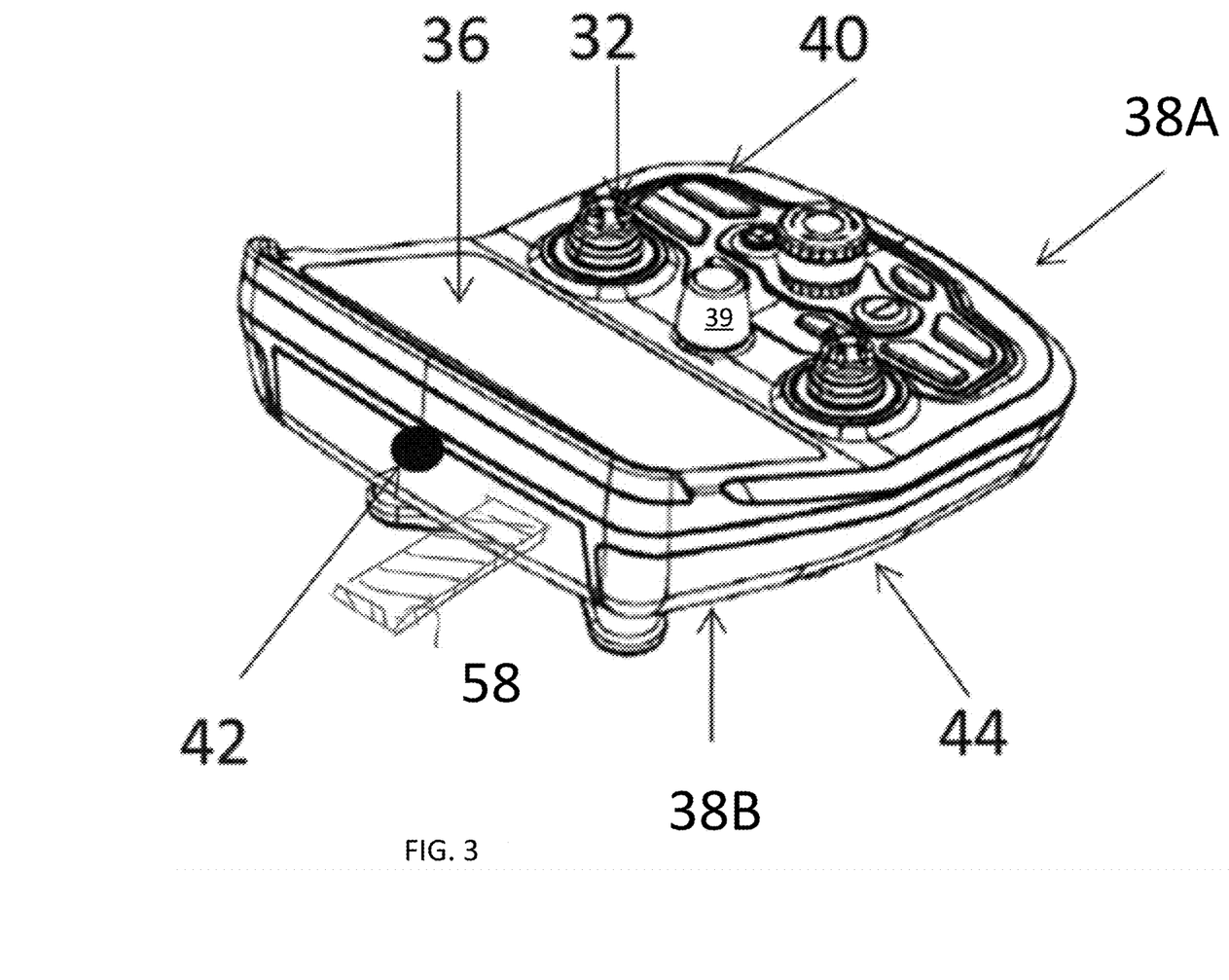
FIG. 3 shows the jogbox of FIGS. 2A and 2B with a removably coupled auxiliary hardware device, in accordance with illustrative embodiments of the invention.

FIG. 3 shows the jogbox of FIGS. 2A and 2B with a removably coupled auxiliary hardware device 58 attached to the jogbox via the auxiliary port 56, in accordance with illustrative embodiments of the invention. Preferably, when coupled, the hardware accessory 58 and body of the jogbox 10 effectively form a single, physically unitary device, which subsequently may be separated at the auxiliary port 56. The hardware accessory 58 may be held onto the jogbox solely by the auxiliary port 56 or may attach to the jogbox body and/or the auxiliary port 56 via a supplemental fastener, e.g., via a snap-fit connection, clips, screws, bolts, or other fasteners. Alternatively, and in contrast, the accessory 58 may connect wirelessly (e.g., using near field communications) with the jogbox 10 without a direct, physical connection. As another example, the accessory 58 may physically connect with the jogbox 10 but still communicate with the jogbox 10 wirelessly.

In illustrative embodiments, the auxiliary hardware device/ accessory 58 cooperates with internal hardware within the body of the jogbox 10 to perform any of a variety of functions. Of course, the auxiliary hardware device 58 preferably augments or otherwise supplements the core metrology functions of the CMM 14. For example, as noted above, the auxiliary hardware device 58 may include one or more of a thermal camera, a bar code scanner, a label printer, a display device, a joystick, and an additional control interface to internal control hardware. In some embodiments, the auxiliary hardware device 58 and/or the internal circuitry of the jogbox 10 may control drones and/or robots. The auxiliary hardware device 58 also may simply augment the internal control hardware itself, such as by adding more processing power, a customized graphical user interface, etc. The auxiliary hardware may take on any of a variety of form factors, such as a dongle, or a larger apparatus. In certain exemplary embodiments, the control hardware will automatically detect the attached auxiliary hardware device, such as the device type or specific make/model, and will activate appropriate logic to allow for operation and use of the attached auxiliary hardware device. This may include, for example, presenting device-specific graphical user interface screens on an integral jogbox display or mapping controls on the jogbox to specific device functions (e.g., mapping a specific jogbox control to capture an image using an attached camera and mapping that same jogbox control to activate the print function of an attached label printer).

Some embodiments have more than one auxiliary port 56 (e.g., two, three or more) to accommodate more than one auxiliary hardware device 58. In preferred embodiments, the jogbox is "plug and play" in that no extra driver or other application software installation steps are required to use the auxiliary hardware devices 58. In other embodiments, the jogbox 10 requires an initial hardware driver step (loading driver software for the auxiliary hardware), such as from a wired or wireless network connection (i.e., the jogbox may have a communications device to communicate with a network, such as the Internet), or directly loaded via an interface port (e.g., a USB port that accepts a memory stick). The auxiliary hardware device 58 thus may include driver software, application software, or other software for a desired CMM augmenting functionality.

Figure 4:
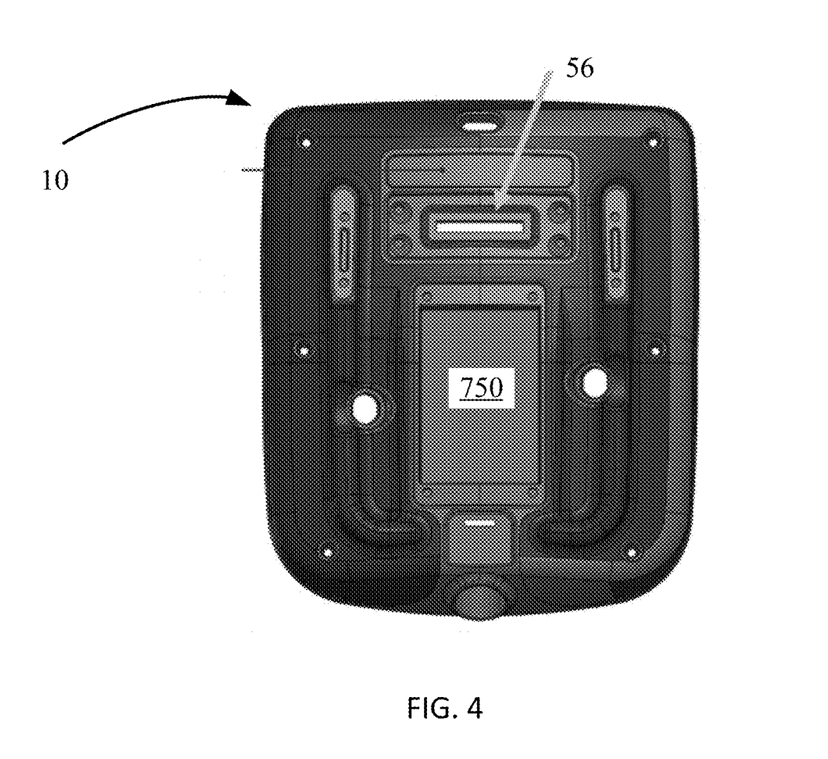
FIG. 4 shows a jogbox having an auxiliary port in the form of a POGO-PIN connector on the bottom of the jogbox, in accordance with illustrative embodiments of the invention.
Figure 5:
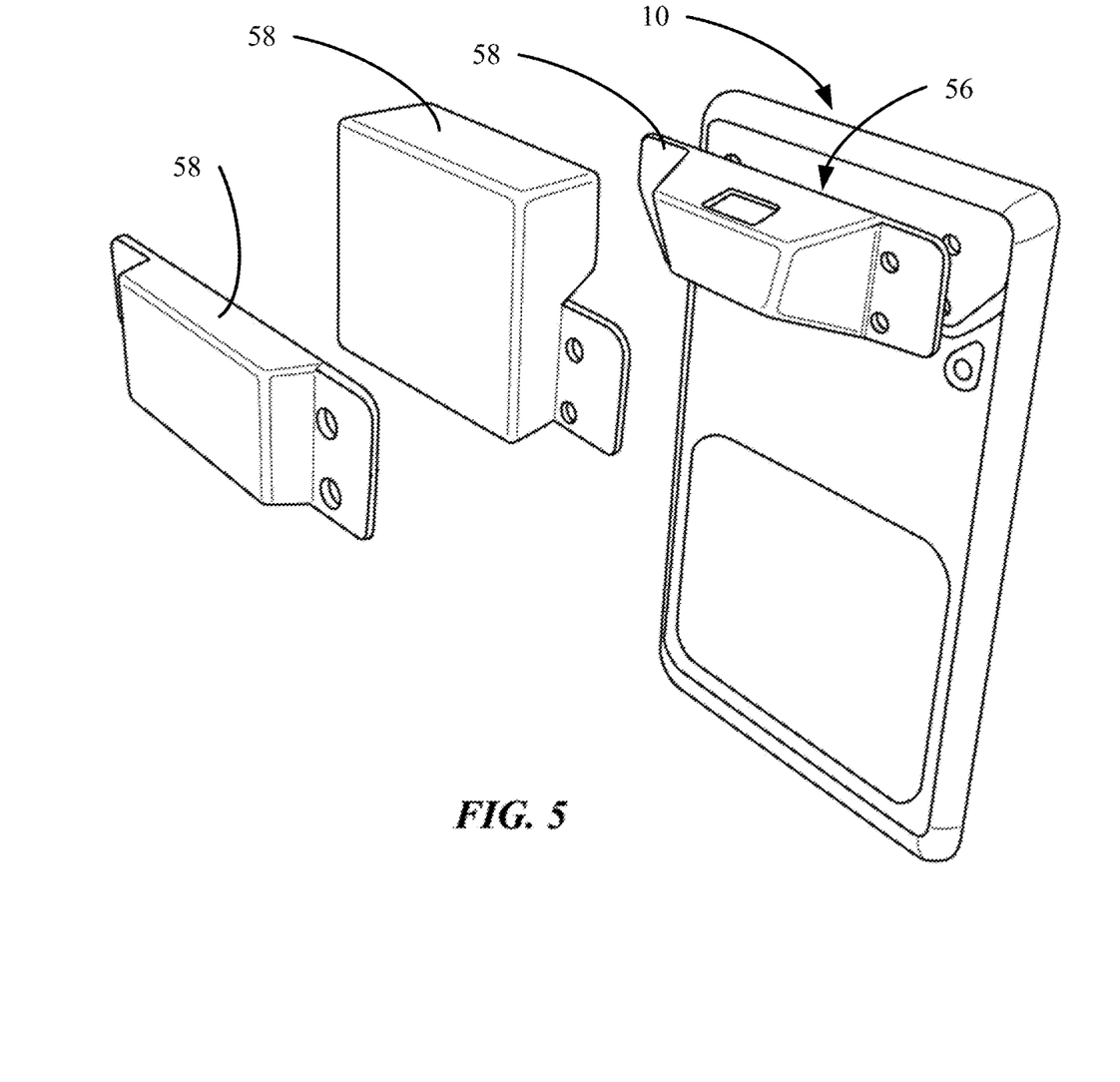
FIG. 5 shows various types of devices and form-factors that can be attached to the POGO-PIN connector of the jogbox of FIG. 4 to form an integrated device, in accordance with illustrative embodiments of the invention.

The auxiliary port 56 may be configured in accordance with any of a variety of different interface standards, such as a USB standard (i.e., a USB port) or a POGO-PIN connector. FIG. 4 shows a jogbox having an auxiliary port in the form of a POGO-PIN connector on the bottom of the jogbox, in accordance with illustrative embodiments of the invention. FIG. 5 shows various types of accessory devices 58 and form-factors that can be attached to an auxiliary port 56, such as but not limited to the POGO-PIN connector of the jogbox of FIGS. 4, to form an integrated device, in accordance with illustrative embodiments of the invention. The accessories 58 may include, but are not limited to, any of the accessory devices described herein, including a UHF RFID reader; a smart card reader; a bar code scanner; a magnetic swipe card reader; a chip card reader; and a camera, to name but a few examples.

For security purposes, the jogbox 10 also may include an authentication sensor for authenticating a user. For example, the authenticator sensor may have a fingerprint and/or iris scanner 39, as schematically illustrated in FIG. 3 for example. To those ends, the authentication sensor may be operatively coupled with the control hardware and or some external security apparatus having the requisite functionality for controlling the sensor and making security decisions.

As shown, the jogbox 10 preferably is portable. This embodiment of FIGS. 2A and 2B is a handheld version in which an average person can hold it entirely in his/her hand(s), completely supporting the weight of the jogbox 10 and any attached auxiliary hardware device(s) 58. As such, some embodiments of the jogbox 10 are designed to be operated while being held entirely in one or both of a single person's hand(s). This is in contrast to other embodiments which are non-hand-held versions, which may be coupled to or part of a console or larger apparatus and, despite being able to be held by a person's hands to some extent, is designed to be supported by a solid foundation (e.g., the floor or CMM body).

Figure 6:
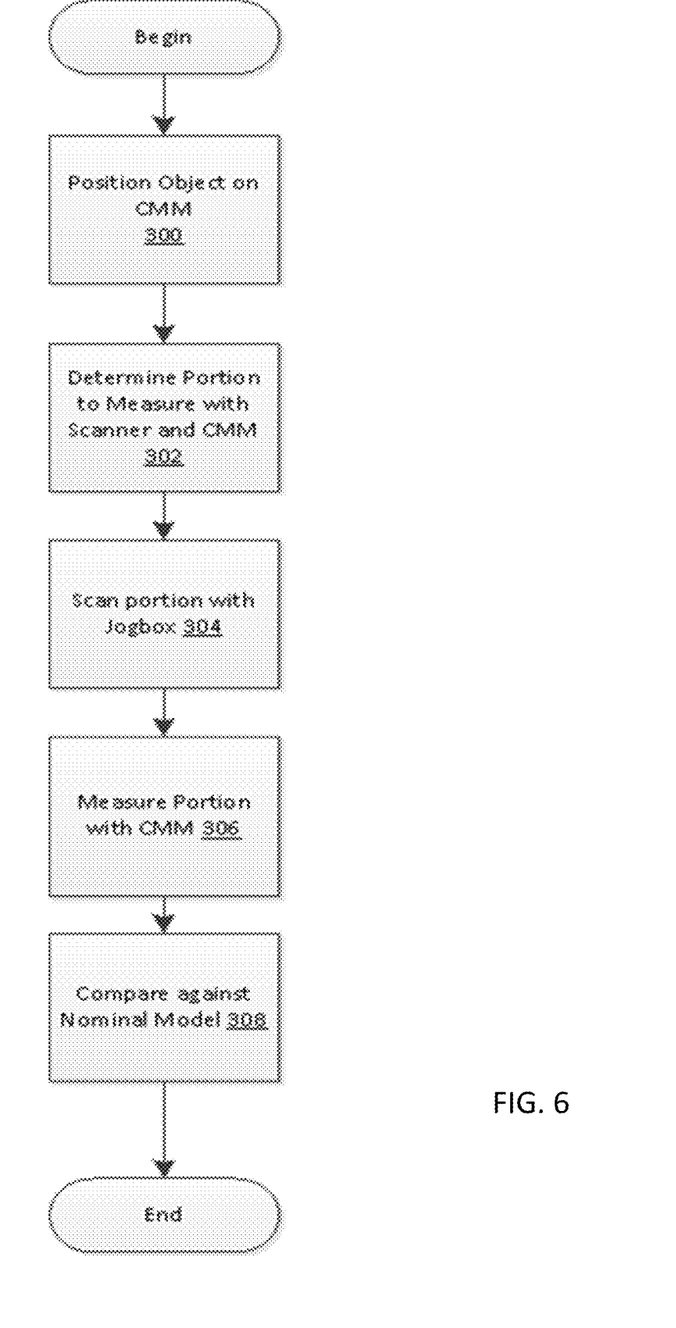
FIG. 6 shows a process flow for using such a jogbox with attached bar code scanner, in accordance with illustrative embodiments of the invention.

It should be noted that the jogbox 10 with attached auxiliary hardware device(s) 58 can provide enhanced flexibility for the operator. For example, a jogbox 10 with an attached bar code scanner can be used to scan a barcode on the work piece in the CMM machine such as to match CMM measurements to a previously-labeled work piece. In this regard, FIG. 6 shows a process flow for using such a jogbox with attached bar code scanner, in accordance with illustrative embodiments of the invention. Here, the user positions the work piece on the CMM in block 300, determines a portion to measure with the scanner and CMM in block 302, scans the portion using the jogbox with attached scanner in block 304, and measures the portion with the CMM in block 306. Generally speaking, the CMM measurements are compared against a nominal model in block 308 in order to determine if the work piece is within predetermined specifications.

Of course, a jogbox with other types of attached auxiliary hardware device 58 can provide similar enhanced flexibility for the operator. For example, a jogbox with an attached label printer can be used to print a label for a specific work piece in the CMM machine such as to match CMM measurements to the specific work piece, and a jogbox with an attached camera can be used to capture images of a work piece in the CMM machine such as for documenting details of the work piece (e.g., defects found during a measurement of the work piece).

Thus, in exemplary embodiments, the same jogbox 10 can be used with different auxiliary hardware device(s) 58 at different times, with the user able to switch auxiliary hardware device(s) 58 as needed for a particular situation. Similarly, a particular auxiliary hardware device 58 can be used with different jogboxes. Consequently, embodiments of jogboxes 10 and auxiliary hardware devices 58 may provide a "mix-and-match" system that can reduce costs (e.g., fewer jogboxes may be needed) and facilitate replacement of defective parts (e.g., a broken bar code scanner can be replaced without having to replace an entire jogbox, and vice versa). Illustrative embodiments therefore take the place of many different instruments / devices that in the prior art required separate devices. Now, those devices may be used in a single, easy to use, portable form factor.

Figure 7A:
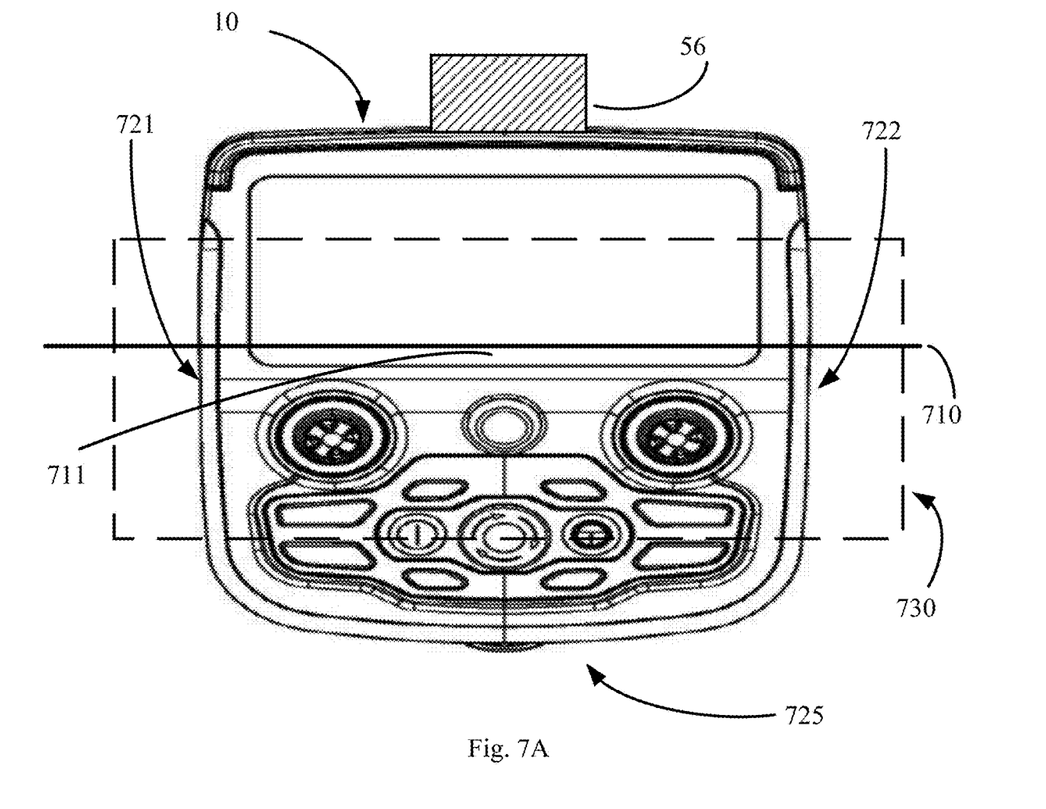
FIG. 7A, FIG. 7B, FIG. 7C and FIG. 7D schematically illustrate embodiments of a jogbox, each including a counterweight interface.
Figure 7B:
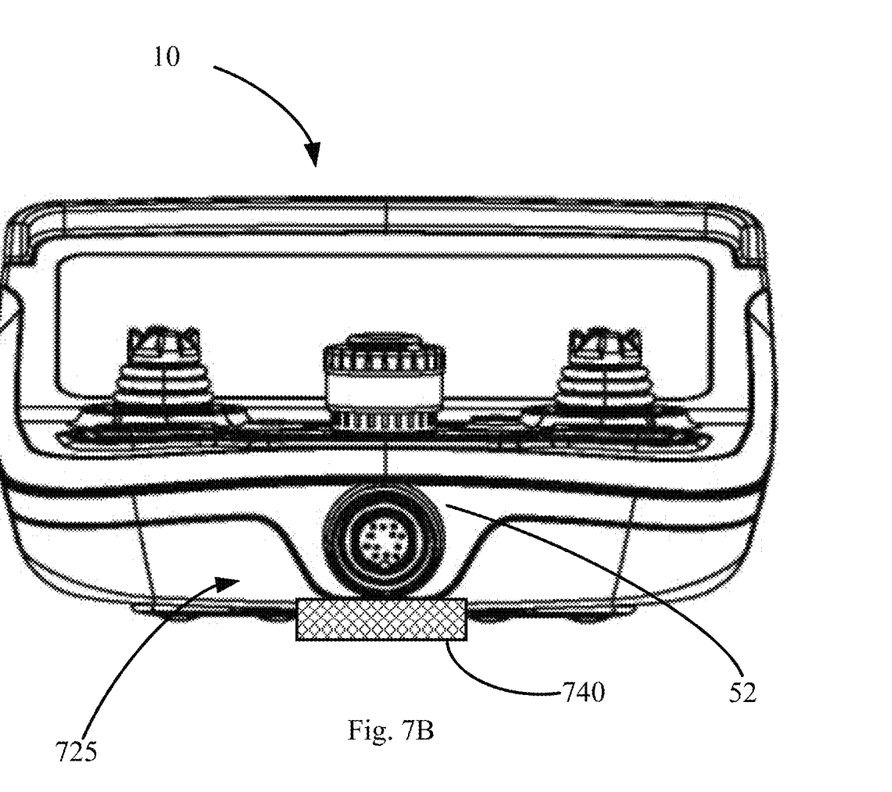
Figure 7C:
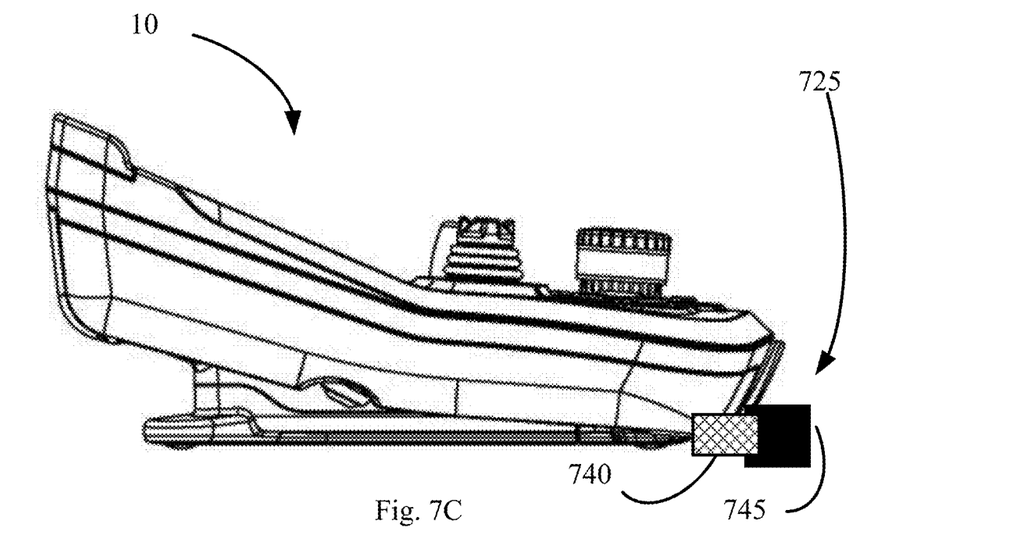
Figure 7D:
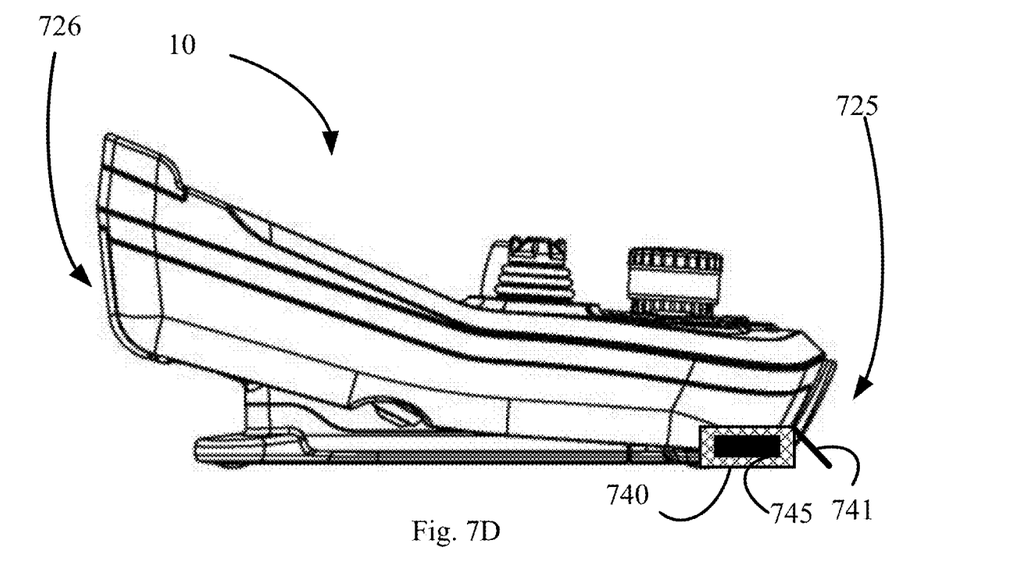

FIG. 7A, FIG. 7B schematically illustrate an embodiment of a jogbox 10 configured to be used with a set of one or more counterweights 745, and FIG. 7C and FIG. 7D each schematically illustrates an embodiment of a jogbox coupled with a counterweight 745. The jogbox 10 may be any of the handheld jogboxes described herein. As used herein, and in any claims, a "set" of counterweights 745 includes at least one counterweight 745, such that a set of counterweights 745 may include as few as a single counterweight 745, or more than one counterweight 745.

The jogbox 10 has a weight attributable to the mass of its components, and a center of mass 711 attributable to the distribution of those components on and in the jogbox 10.

In use, an operator holds the jogbox 10, and typically holds the jogbox 10 in such a way that one portion of the jogbox 10 is nearer the operator's torso than other parts of the jogbox 10. For example, referring to FIG. 7A, an operator may grasp the jogbox 10 with two hands—e.g., a left hand at grip location 721 and a right hand at grip location 722—with the front edge 725 nearest the operator's torso. The operator therefore supports the weight of the jogbox 10 with the muscles of her hands and arms.

Some embodiments of the jogbox 10 may also have an axis of rotation 710 around which the jogbox 10 tends to rotate when held by an operator. For example, in the embodiment of FIG. 7A, the axis of rotation may be a line (710) that passes through the jogbox (e.g., through volume 730) between grip location 721 and grip location 722. In such embodiments, in addition to supporting the weight of the jogbox 10, the muscles of the operator's hands and arms also work to counter that tendency to rotate.

Because the center of mass 711 and axis of rotation 710 of a jogbox 10 depends on the mass of its components and their distribution, different embodiments of a jogbox 10 will have a corresponding center of mass 711 and axis of rotation 710.

Moreover, the tendency of the jogbox 10 to rotate may be exacerbated by the mass of an accessory 58, such as any of the accessories described herein, when such an accessory 58 is physically coupled to the jogbox 10. The center of mass 711 of a jogbox 10 depends, and the location of the axis of rotation 710 of the jogbox 10 may (e.g., depending on where the accessory 58 is attached to the jogbox 10) depend, on whether an accessory 58 is coupled to the jogbox 10, since the accessory 58 has a mass.

For example, if an accessory 58 is coupled at or near an edge 726 of the jogbox 10, which edge 726 is distal from the front edge 725 (see, e.g., FIG. 3; FIG. 7A), the weight of that accessory 58 may change the location of the center of mass 711 of the jogbox 10, and move the location of the axis of rotation 710, and thereby create, or increase, a tendency of the jogbox 10 to rotate around the axis of rotation (in this embodiment, for example, causing the edge 726 to tend towards the floor on which the operator stands, and causing the front edge 725 to tend upwards toward the operator's head).

It should be noted, however, that in some embodiments the auxiliary port 56 is positioned such that attaching of at least one embodiments of an accessory 58 to the auxiliary port 56 does not create, or increase, a tendency of the jogbox 10 to rotate around the axis of rotation. For example, in FIG. 4, the auxiliary port 56 on the rear face of the jogbox 10 may be disposed, relative to other components of the jogbox 10, such that a given accessory 58 does not create, or increase, a tendency of the jogbox 10 to rotate around the axis of rotation.

To mitigate the tendency of a jogbox 10 to rotate, some embodiments include a counterweight interface 740 configured to receive and retain a set of counterweights 745. Such embodiments may include any of the jogbox embodiments disclosed herein. For example, inclusion on or in a jogbox 10 of a set of counterweights 745 may shift the axis of rotation 710 towards, or to, the center of mass 711, thereby reducing the tendency of the jogbox 10 to rotate around that axis 710.

In preferred embodiments, a counterweight 745 is an inert body and does not include electronics. In some embodiments, a counterweight 745 is non-magnetic and non-conductive, so as to reduce or illuminate risk that the counterweight 745 interferes electrically, magnetically, or electromagnetically with the coordinate measuring machine or a workpiece measured by the coordinate measuring machine. In some embodiments, the counterweight 745 has a non-conductive outer shell or coating, such as rubber or ceramic to name but a few examples.

In any of the embodiments disclosed herein, the counterweight interface 740 is a passive physical structure that does not include an electronic interface. In other embodiments, however, the counterweight interface 740 may also include an electronic interface.

In some embodiments, such as the jogbox 10 in FIG. 7C, the counterweight interface 740 is a connector (e.g., a threaded or press-fit connector) to which one or more counterweights 745 may be removably coupled. In such embodiments, the counterweights 745 may remain outside of the housing of the jogbox 10.

In alternative embodiments, such as the jogbox 10 in FIG. 7D, the counterweight interface 740 may be a receptacle having a volume within the housing of the jogbox 10, which receptacle opens to the space external to the housing. Some such embodiments include a cover or cap 741 configured to controllably close the volume of the counterweight interface 740, for example to help hold one or more counterweights 745 within the counterweight interface 740. Such a cover or cap 741 may be opened or removed to insert one or more counterweights 745 into the counterweight interface 740, and/or to remove one or more counterweights 745 from the counterweight interface 740.

In some embodiments, the counterweight interface 740 receptacle is further configured as a battery compartment 750 (see e.g., FIG. 4), to hold one or more batteries in addition to simultaneously holding one or more counterweights 745. In other embodiments, the counterweight interface 740 receptacle is further configured as a battery compartment 750, to hold one or more batteries as an alternative to holding one or more counterweights 745.

Although the foregoing embodiments illustrate the counterweight interface 740 on the front face 725 of the jogbox 10, that is not a limitation on the location of the counterweight interface 740. In general, the counterweight interface 740 is disposed on a portion of the jogbox 10 that is opposite the location of the auxiliary port 56. For example, in FIGS. 7A-7C, the counterweight interface 740 on the front face 725 of the jogbox 10 is on the opposite side of the jogbox 10 from the auxiliary port 56, which is on edge 726. Preferably, the counterweight interface 740 is disposed such that the center of mass 711 of the jogbox 10 is directly between the counterweight interface 740 and the auxiliary port 56 passes (i.e., a line between the counterweight interface 740 and the auxiliary port 56 passes through the center of mass 711).

In general, the mass of the counterweights is selected to balance the jogbox 10 (i.e., mitigate or completely eliminate the tendency of the jogbox 10 to rotate) when an accessory 58 is attached. As such, it may be said that the counterweights 745 counterbalance the accessory 58. Consequently, the mass of the counterweights 745 may depend in part on the mass of the accessory 58, and the center of mass 711 of the jogbox 10 when an accessory 58 is attached to the jogbox 10, as well as the location on the jogbox of the auxiliary port 56. Some accessories 58 may be supplied with a set of counterweights 745 selected to engage with the counterweight interface 740 to balance the jogbox 10 when said accessory 58 is coupled to the jogbox 10.

Figure 8:
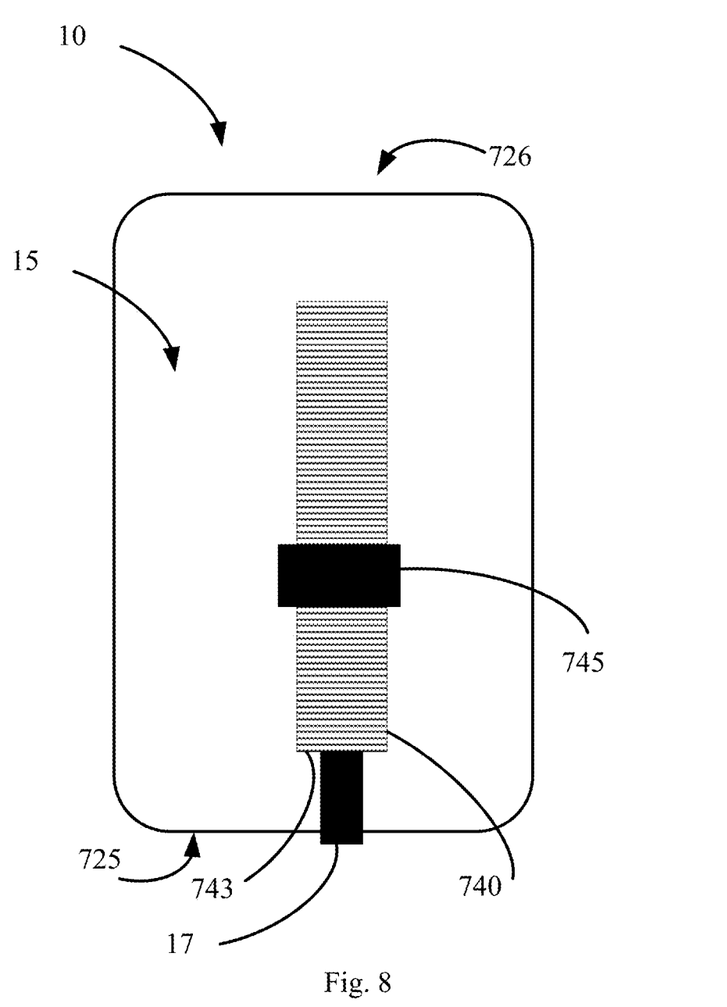
FIG. 8 schematically illustrates an embodiment of a jogbox with an internal counterweight system.

FIG. 8 schematically illustrates an embodiment of a jogbox with an internal counterweight system. In this embodiment, the counterweight interface 740 and set of counterweights 745 is disposed in the interior 15 of the jogbox 10. The counterweight interface 740 is configured to retain the set of counterweights 745, and to allow the set of counterweights 745 to move between the ends 741 and 742 of the counterweight interface 740. For example, the counterweight interface 740 may be a bar along which an operator may slide the set of counterweights 745. In some embodiments, the counterweight interface 740 is a threaded rod rotatably mounted to the body of the jogbox 10. The threaded rod includes threads configured to engage counterpart threads on one or more counterweights 745. In such an embodiment, an operator may adjust the location of the set of counterweights 745 along the threaded counterweight interface 740 by turning the threaded counterweight interface 740. To that end, the threaded counterweight interface 740 may have a control interface 743 with a slot or slots configured to engage with a screwdriver, or a thumbwheel configured to be manipulated by the hand of the operator, to name but a few examples. The interface 743 may be accessible to the operator without opening the jogbox 10, for example via an access point 17. In preferred embodiments, the jogbox 10, including the access point 17, is sealed, and the operator can manipulate the control interface 743 while the jogbox 10 remains sealed.

Various embodiments may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A jogbox for a coordinate measuring machine, the jogbox having an axis of rotation around which the jogbox tends to rotate when an accessory is coupled to the jogbox, the jogbox comprising:
 a body forming an interior;
 a CMM interface configured with a CMM communication protocol to communicate with the coordinate measuring machine;
 control hardware at least partially within the interior, the control hardware being configured to control the movable arm of the coordinate measuring machine via the CMM interface;
 an energizing port for energizing or charging the jogbox;
 an auxiliary port formed by the body and operatively coupled with the controlling hardware within the interior, the auxiliary port configured to directly physically connect with at least one hardware accessory that has a hardware interface port, the auxiliary port being configured to rigidly, removably, and directly couple with the hardware interface port of the at least one hardware accessory; and
 a counterweight interface (740) configured to receive and retain a set of counterweights, the counterweight interface (740) disposed such that a counterweight (745), when engaged with the counterweight interface (740), mitigates a tendency of the jogbox to rotate around an axis of rotation when an accessory (58) is physically coupled to the auxiliary port (56).

P2: The jogbox of P1, wherein the auxiliary port (56) is disposed at a first location on the jogbox, and the counterweight interface (740) is disposed at a second location on the jogbox, the second location being opposite the first location.

P3: The jogbox of P1, wherein:
 the auxiliary port (56) is disposed at a first location on the jogbox; and
 the counterweight interface (740) is disposed at a second location on the jogbox, the second location being opposite the first location.

P4: The jogbox of P1, wherein:
 the auxiliary port (56) is disposed at a first location on the jogbox; and
 the counterweight interface (740) is disposed at a second location on the jogbox, the second location being opposite the first location, said second location being nearest a torso of an operator when the jogbox is held by the operator for operating the coordinate measuring machine P5: The jogbox of any of P1-P4, wherein the counterweight interface (740) comprises a threaded interface configured to retain the counterweight (745) external to the interior of the jogbox.

P6: The jogbox of any of P1-P5, wherein the counterweight interface (740) comprises a receptacle within the interior of the jogbox, the receptacle configured to retain the counterweight (745) within the interior of the jogbox.

P7: The jogbox of P6, further comprising a cover or cap configured to close the receptacle.

P8: The jogbox of any of P6-P7, wherein the receptacle if further configured as a battery compartments, to hold one or more batteries in addition to simultaneously holding the counterweight.

P9: The jogbox of any of P6-P7, wherein the receptacle if further configured as a battery compartments, to hold one or more batteries as an alternative to holding a counterweight.

Although the above discussion discloses various exemplary embodiments of the invention, it should be apparent that those skilled in the art can make various modifications that will achieve some of the advantages of the invention without departing from the true scope of the invention.

What is claimed is:

1. A jogbox for a coordinate measuring machine having a movable arm, the jogbox comprising:
    a body forming an interior;
    a CMM interface configured with a CMM communication protocol to communicate with the coordinate measuring machine;
    control hardware at least partially within the interior, the control hardware being configured to control the movable arm of the coordinate measuring machine via the CMM interface;
    an energizing port for energizing or charging the jogbox; and
    an auxiliary port formed by the body and operatively coupled with the controlling hardware within the interior, the auxiliary port configured to directly physically connect with at least one hardware accessory that has a hardware interface port, the auxiliary port being configured to rigidly, removably, and directly couple with the hardware interface port of the at least one hardware accessory.

2. The jogbox of claim 1 wherein the auxiliary port is configured to couple with the hardware interface port without a connecting cable.

3. The jogbox of claim 1 wherein the energizing port comprises a wireless energizing port.

4. The jogbox of claim 1 wherein the energizing port comprises a wired port.

5. The jogbox of claim 1 further comprising the at least one hardware accessory.

6. The jogbox of claim 1 wherein the body is configured to be hand-held.

7. The jogbox of claim 1 wherein the housing and the hardware accessory form a removably coupled unitary object when coupled.

8. The jogbox of claim 1 further comprising a display operatively coupled with the auxiliary port.

9. The jogbox of claim 1 wherein the hardware accessory includes one or more of a thermal camera, a bar code scanner, a label printer, a display device, a joystick, and an additional control interface to the control hardware.

10. The jogbox of claim 1 wherein the auxiliary port comprises a USB port.

11. The jogbox of claim 1 further comprising an authentication sensor for authenticating a user, the authentication sensor operatively coupled with the control hardware.

12. The jogbox of claim 1 wherein the hardware accessory comprises a dongle.

13. The jogbox of claim 1, wherein the auxiliary port is on a bottom of the jogbox.

14. The jogbox of claim 1, further comprising:
    a first face and a second face, wherein the second face side is on an opposite a side of the jogbox from the first face;
    a display disposed on the first face; and
    the auxiliary port disposed on the second face of the jogbox.

15. The jogbox of claim 1, wherein the at least one hardware accessory is rigidly and removably held by the auxiliary port.

16. The jogbox of claim 1, wherein the at least one hardware accessory is rigidly and removably held on the jogbox using at least one fastener.

17. The jogbox of claim 1, further comprising a counterweight interface configured to receive and retain a set of counterweights.

18. The jogbox of claim 17, wherein the counterweight interface comprises a receptacle having a volume within the interior of the jogbox, and is configured to retain a set of counterweights within the interior.

19. The jogbox of claim 18, further comprising a cover configured to close the receptacle and retain a set of counterweights within the receptacle wherein the counterweight interface comprises a threaded member configured to engage a set of counterweights such that the location of the set of counterweights is adjustable.

20. The jogbox of claim 17, wherein the counterweight interface comprises a bar along with a set of counterweights may slide between ends of the counterweight interface.

* * * * *

UNITED STATES PATENT AND TRADEMARK OFFICE
CERTIFICATE OF CORRECTION

| | | |
|---|---|---|
| PATENT NO. | : 11,118,890 B2 | |
| APPLICATION NO. | : 16/519962 | |
| DATED | : September 14, 2021 | |
| INVENTOR(S) | : Paul Witkos | |

It is certified that error appears in the above-identified patent and that said Letters Patent is hereby corrected as shown below:

In the Claims

At Column 12, Claim number 14, Line number 17, please delete "a" after "opposite"

At Column 12, Claim number 20, Line number 41, please replace "with" with --which--

Signed and Sealed this
Eleventh Day of July, 2023

*Katherine Kelly Vidal*

Katherine Kelly Vidal
*Director of the United States Patent and Trademark Office*